(No Model.) 3 Sheets—Sheet 2.

J. HOWES.
FILTER.

No. 280,828. Patented July 10, 1883.

WITNESSES
A. W. Mathews
C. R. Barton

INVENTOR
John Howes
By Chas. H. Burleigh

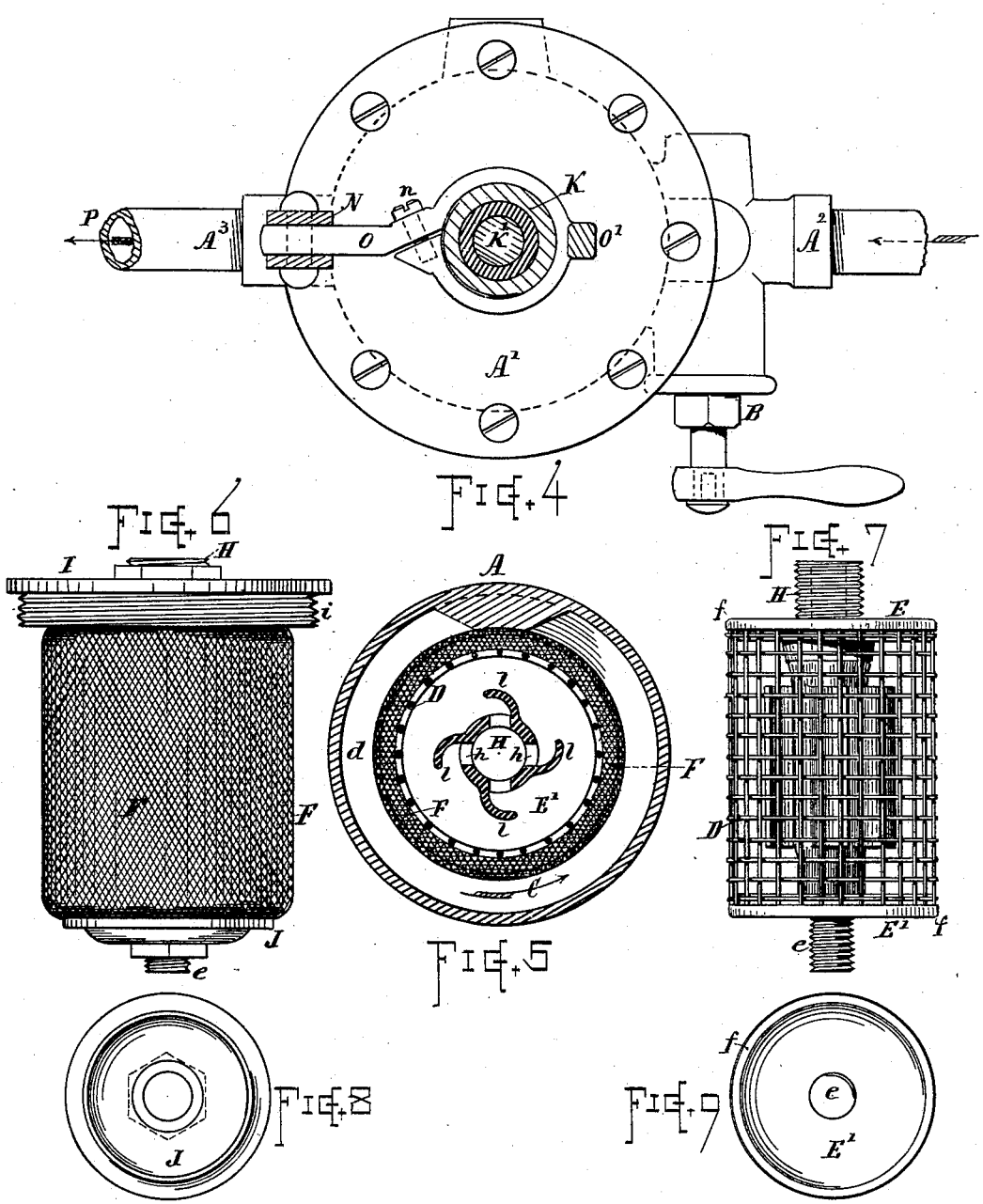

UNITED STATES PATENT OFFICE.

JOHN HOWES, OF WORCESTER, MASSACHUSETTS.

FILTER.

SPECIFICATION forming part of Letters Patent No. 280,828, dated July 10, 1883.

Application filed June 17, 1882. (No model.)

*To all whom it may concern:*

Be it known that I, JOHN HOWES, of Worcester, in the county of Worcester and State of Massachusetts, have invented certain new and useful Improvements in Filters; and I declare the following to be a description of my said invention, sufficiently full, clear, and exact to enable others skilled in the art to which it appertains to make and use the same, reference being had to the accompanying drawings, which form a part of this specification.

The objects of my invention are to provide an efficient and durable filtering apparatus adapted for large or small service or for manufacturing or household uses, and in which is contained in compact form an ample area of filtering-surface to give rapid flow, and means for the ready cleansing of the filtering-surfaces and discharge of the collected sediment without disturbing the filter material; also, to afford a reactive flow of the filtrate or water through the felting for forcing the lodged particles of sediment from the filter surface or strainer, and an additional current along said surface for carrying away such sediment as it becomes dislodged; also, to provide a convenient force-pump or means for mechanically governing and augmenting the action or flow of liquid through the felt or filtering material in reverse direction for the purposes of cleansing.

To this end my invention consists in a filtering apparatus constructed and organized for operation substantially as shown in the accompanying drawings and herein described, and in the several parts and combinations appertaining thereto, the particular subject-matter claimed being hereinafter definitely specified.

Figure 1:
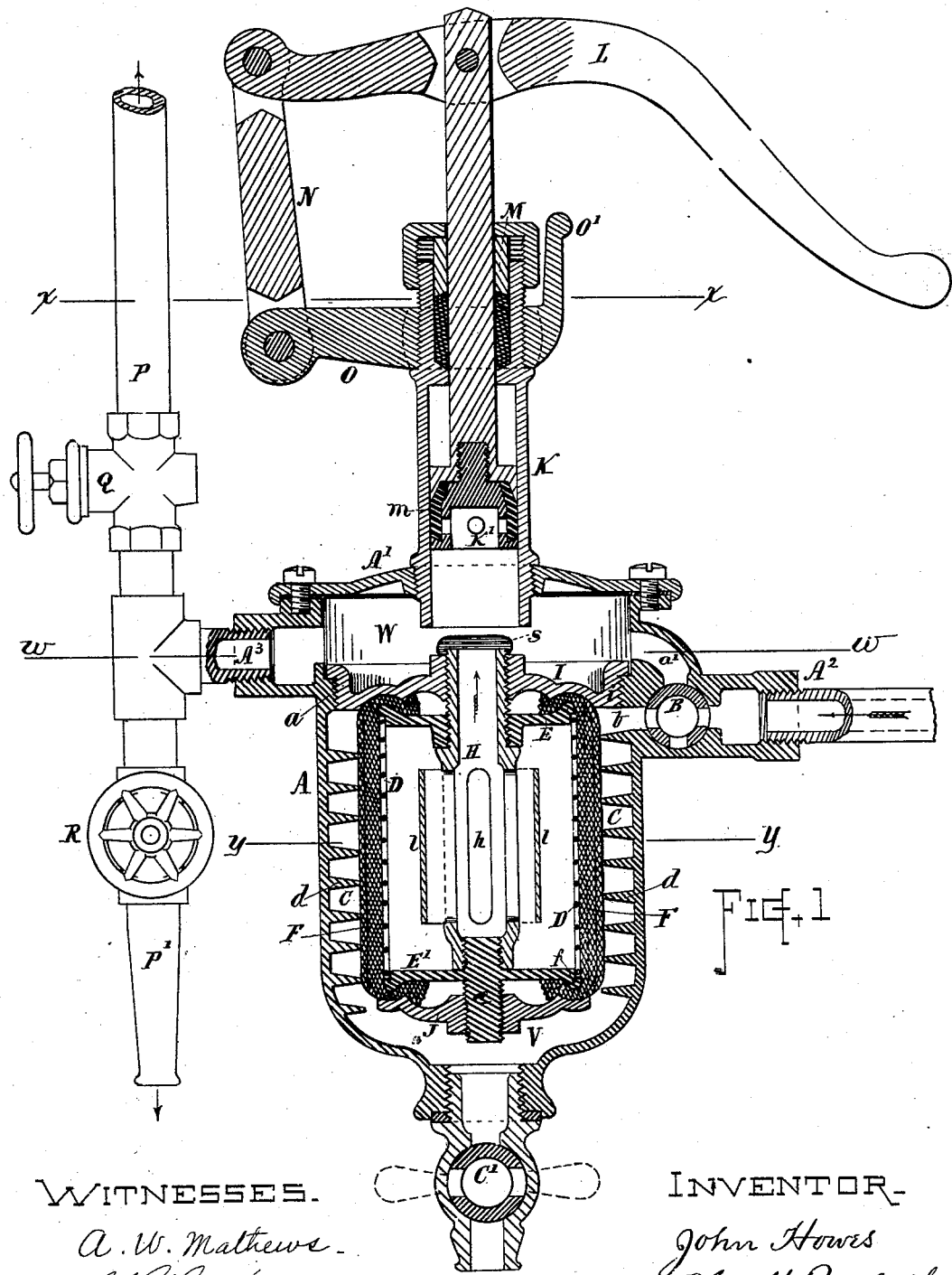
Figure 2:
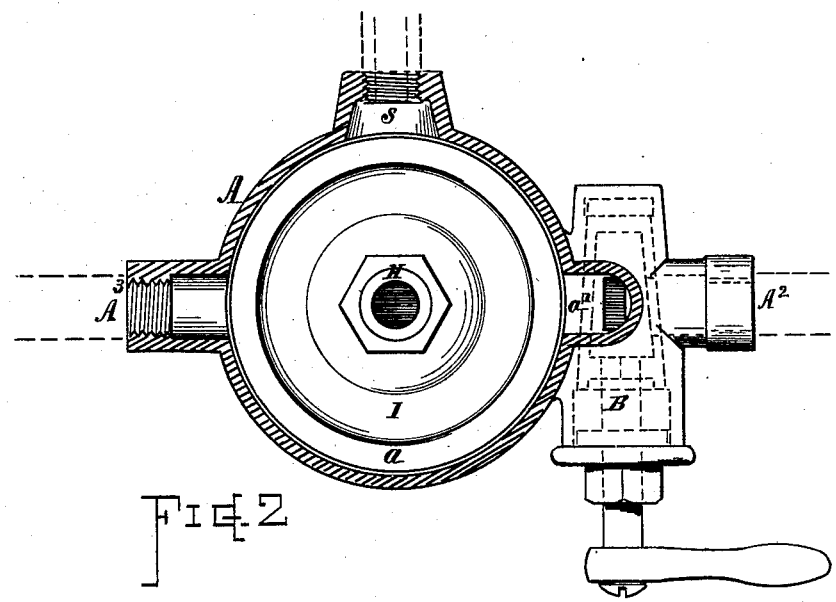
Figure 3:
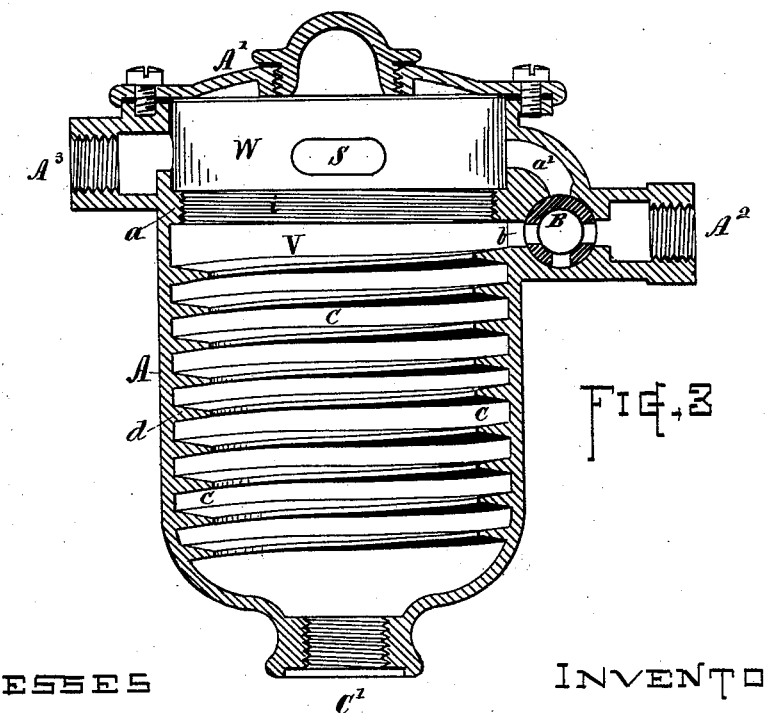

Figure 1 represents a vertical sectional view through the center of my improved filtering apparatus. Fig. 2 is a horizontal sectional view at the position of line $w$ $w$, Fig. 1. Fig. 3 is a vertical central section of the shell or casing with the filter material and internal parts removed for showing the helical flange and passage which surrounds the filtration-cylinder. Fig. 4 is a plan view of the filter-body and a horizontal section of the pump at the position of line $x$ $x$, Fig. 1. Fig. 5 is a horizontal section through the filter at the position indicated by line $y$ $y$, Fig. 1. Fig. 6 is a side view of the filtration-cylinder separate from the case, showing the felt or filter material and devices for supporting it within the apparatus. Fig. 7 represents a side view of the core and frame for supporting the filtering-felt separate from the other parts. Fig. 8 is a plan view of one of the clamping-disks for retaining the filtering-felt. Fig. 9 is a plan view of one of the head-plates of the supporting device, over which the felting is secured.

In the drawings, A denotes the shell or case, made of suitable metal in the form shown, with upper and lower chambers separated by the annular flange $a$, on which the internal parts are supported. The top of the shell is formed open, and is provided with a removable cap-plate, A', secured thereto by screws or in any other suitable manner, so that it can be taken off for allowing access to the interior.

$A^2$ indicates the inlet, with a boss for the connection of the service-pipe by which water or liquid is supplied to the filter, and $A^3$ the delivery-passage, having a suitable boss for connecting the faucet or pipe through which the filtrate or purified water is conveyed to the place of draft, as desired.

B is a cock or plug-valve arranged in the inlet-passage, and provided with three ports adapted for opening and closing the several passages and directing the flow of liquid through the filter, as desired. A passage, $a'$, leads to said cock from the upper or filtrate chamber, W, and a passage, $b$, leads from said cock to the upper part of the lower or separating chamber, V, as shown.

At the bottom of the shell there is a passage and boss provided with a suitable stop-cock, C', through which the accumulated sediment and dirt can be discharged from the separating-chamber.

The interior of the shell is provided with a helical flange or rib, $d$, running in the manner of a screw-thread from the upper to the lower part of the filter within the separating-chamber and dividing the space between the filtration-cylinder and shell into a narrow helical channel, C, through which the water or liquid passes to the filtering-surface and also to the discharge-cock C', the helical rib guiding the flow of liquid around the filtration-cylinder and downward at a pitch corresponding with the width of the rib and channel. Two ribs can be employed, if desired, so as to form a double way or channel.

F denotes the filter material, which consists, preferably, of a cylinder or tube of felt or woven fabric in one or more thicknesses or plies arranged over a cylindrical netting or grate, D, of wire or other suitable material of proper size to fit the interior diameter of the chamber V between the coils of the rib d, so that the outer surface of the felt will press lightly against the edges of said rib or helical flange d, which thus supports the filtration-cylinder against outward pressure and prevents the water or liquid from flowing across the partition from one coil of the channel to the next. The ends of the tubular felt or filter fabric and the netting or grating D are retained and supported by disks or heads E and E', connected to a central core-piece or tubular standard, H, which also serves as a conductor or passage from the interior of the filtration-cylinder V to the filtrate-chamber W. The lower disk, E', is made with a central screw-threaded stud, e, the upper disk, E, with a screw-threaded opening, and the tubular standard H passes through the upper disk and screws onto the stud e of the lower disk. The disks E and E' are provided with rims or flanges f at their outer edges, and with peripheral recesses to receive and support the netting or grate D, as shown. The ends of the tubular felt F are turned inward over the rim-flanges f of the disks E E', and are retained by clamping-plates I and J screwed onto the central standards in the manner illustrated, so as to firmly clamp the edges of the filter fabric F between said plates and disks. The clamp-plates are formed with suitably curved surfaces and projecting annular flanges to press upon the felt just back of the disk-flanges f, so as to draw the felt close and taut and prevent any liability of its working loose by the pressure of the liquid. The drawing in of the ends of the felting F or filter fabric over the edges of the disks or flanges E E' can be facilitated by running a cord into the edges of the fabric and the drawing or puckering them in, similar to the manner of closing of the mouth of a bag. The upper plate, I, projects beyond the circumference of the filter-cylinder, and is fitted by a screw-thread, i, to the annular flange a of the shell A, or otherwise secured thereto, so as to support the filtering devices, and also form a partition between the lower and upper chambers, as indicated. The tubular standard or core-piece H is provided with longitudinal slots or openings h through its sides, each of which is furnished with a projecting flange or guard, l, inclined or curved in such manner as to give to the liquid a circuitous flow or whirl action within the filtration-cylinder, thus preventing the liability of the liquid boring or rapidly wearing the felt F at certain positions in front of the slots h by the direct impingement of the currents against the inner surface of the felt during the reverse action of the liquid.

K indicates a pump or device for mechanically forcing the water or filtrate reversely through the filter, or imparting thereto a pulsating action, thereby augmenting its cleansing-power. Said pump is arranged upon the top of the filter at any convenient position for communicating with the filtrate-chamber W. In the present instance the piston K' is operated by a suitable handle or lever, L, connected to the top of the piston-rod and fulcrumed by means of a link, N, to a supporting piece or arm, O, having a threaded eye or open-sided rim that screws onto the outside of the pump-cylinder, and is clamped in any adjusted position by the screw n, as indicated. The support-piece O is furnished with an arm or projection, O', which serves as a stop for the handle L when the pump-piston is forced down to its lowest position.

The piston of the pump K is properly packed, as at m; and a suitable stuffing-box, M, is provided around the piston-rod to prevent leakage.

The pipe P, which connects with the delivery-passage $A^3$, may be carried to a tank for storage of filtered water, and may serve as a stand-pipe to give head-pressure and quantity of water for the reverse action when cleansing the filter. The lower part of said pipe, P', may serve as a delivery to draw from as required, suitable cocks or valves, Q and R, being arranged in said pipe, as shown, or in any other suitable manner.

Faucets may, if desired, be used in the place of the pipe P and plug-cock C'. A boss and passage are formed on the side of the shell, communicating with the filtrate-chamber W, for the purpose of connecting a pipe leading from a suitable steam generator or boiler, whereby a supply of steam or hot water under pressure can be forced through the filtration-cylinder for cleansing or revivifying the felts to a more thorough degree than could be accomplished by water at ordinary temperature. This steam attachment is a valuable auxiliary, especially for large-sized filters used for manufacturing purposes and for household purposes in cases where the water contains much foreign matter; but for many ordinary purposes it may not be required, or it may be inconvenient to obtain steam, and in such cases it can be dispensed with, if desired.

In the operation of the filter the water passes into the lower chamber by way of the passage b and helical channel C. From there it percolates through the felt or filtering material F to the interior of the filtration-cylinder, then upward through the tubular standard H to the chamber W, from which it is delivered through the outlet $A^3$ and pipe P, as required. For washing the deposited matter from the filter the cock C' is opened, so as to cause a rapid, strong current to circulate in the channel C in contact with the surface of the felt F, and this current carries away the sediment which has collected from the liquid previously passed to the filtrate-chamber W.

By another method of cleansing the filtering-felt F the cock C' is opened and the passage b more or less closed by the cock B, so that the filtered water from the chamber W can flow down to the interior of the filtration-cylinder and pass reversely through the felt or filtering material for forcing off the lodged particles of sediment, and at the same time an additional current of unfiltered water can be kept running in the helical channel C around the outside of the filtration-cylinder, which latter current washes away or removes the sediment as it becomes dislodged from the surface of the felt by the outflow of filtered water. When desired, the cock B can be turned so as to cause filtered water from the chamber W to flow through the channel C by way of the passages $a'$ $b$.

When in use as set up for ordinary household purposes, the cleansing of the filter is rendered automatic by the ordinary drafts of liquid from the cock C', since this cock will be used many times a day, or whenever a supply of water for common purposes is drawn, and for which unfiltered water will serve, the flow from this discharge being quicker than that of the filtered water. The rapid flow of the water in the channel C when this cock C' is opened washes the surface of the felt F upon which the sediment has been deposited by previous drafts of filtered water. Similar effects would ensue when the discharge-passage of the lower chamber, V, is connected with the water-closets, garden-hydrants, &c., as every time such fittings are used the surface of the filter fabric F becomes washed by the rapid flow of liquid in channel C, and the sediment deposited from the filtered liquid is thus carried off before the accumulation thereof upon the felt becomes sufficient to interfere with the proper action of the filter, so that no especial attention is required, except for the renewal of the felts F at long intervals of time as they become worn out, which renewal can be quickly accomplished by shutting off the flow by cock B, removing the cap and filtration-cylinder and turning off the screw-clamp plates which retain the ends of the felt tube; then, by changing the tube and replacing the several parts in position, the filter is again ready for use. The reverse current through the filtering-felt F can be augmented and pulsated by working the pump so that the water can be made to act with great force for dislodgment of sediment, even though the normal pressure from the stand-pipe P may be slight. It will be understood that when working the pump the valves Q and R would be closed.

It will be observed that the felt of the filtration-cylinder is condensed by the action of the water or liquid while depositing its sediment thereon, the flow being from the exterior to the interior of said cylinder, and that the felt is stretched or distended when cleansing or washing off such deposited sediment, as the flow is then from the interior of said cylinder outward. This action of condensing and expanding the felt greatly assists the cleansing operations, as the distention of the felt tends to release the particles of sediment lodged among its fibers. When steam or hot water is forced through the felt from the pipe S, the supply of cold water may be wholly or partially shut off by the cock B, so that there will not be too great resisting-pressure from the exterior of the felt, thus giving to the hot current of water or steam full and effective action.

The space within the filtration-cylinder V between the grating D and the tubular core or standard H may, if desired, be filled with pulverized charcoal or similar substance, a fine wire-gauze being placed over the openings $h$, leading to the chamber W, to prevent its escape, thus combining mechanical and chemical filtration in a convenient and practical form.

If desired, the filter apparatus herein described may be made and used without the force-pump.

In the case of large-sized filters used for manufactories, suitable appliances may be connected with the pump K, so that it can be operated by power, instead of by hand, the piston-rod being operated by a crank with gears or pulleys, or connected in any convenient manner with the motor or mill machinery.

In lieu of making the lower part of the shell cylindrical, it may be somewhat conical; or the internal diameter between the face-lines of the helical flange or screw-thread may be made less at the bottom than at the top, and the filtration-cylinder may be made with a corresponding taper, so that it can be more easily inserted and withdrawn from the shell when necessary.

This filter is eminently adapted for the filtration of dyes, drugs, beer, and other substances in the course of manufacture, as well as for use on water-service.

Having on even date herewith made application for separate Letters Patent for improvements in filters, it will be understood that the features embraced in my present application appertain to filters of cylindrical or conical form, and that I do not herein include features appertaining to filters of disk form, such as are claimed in my said separate application.

What I claim as of my invention, and desire to secure by Letters Patent, is—

1. A filter case or shell provided with a rib or partition-flange arranged in the manner of a screw-thread to form an inclosed helical circumferential circulation-channel, in combination with a cylindrical or conical filter, and supply and delivery passages communicating with said channel and the interior of said filter, substantially as and for the purpose hereinbefore set forth.

2. A filter formed of felt or woven fabric in cylindrical or tubular form, with its ends secured and sustained by disks or heads, in combination with an exterior casing having a helical circulating-channel and an interior tubular delivery, substantially as set forth.

3. The case or shell constructed, substantially as shown and described, with the inlet, delivery, and discharge passages, and having an inwardly-projecting helical flange arranged around its interior, embracing and supporting the filtering material, and forming a channel about the surface thereof, as and for the purpose hereinbefore set forth.

4. The combination, substantially as hereinbefore described, of the cylindrical body or shell having inlet and outlet passages, and provided with an internal helical flange and channel, the filtration-cylinder having a surface of tubular felt or woven fabric arranged within said shell and externally embraced by said helical flange, the tubular core or standard with flanged top plate for supporting said cylinder and separating the chambers, the inlet-cock, the delivery-cock, and discharge-cock arranged within the respective passages for controlling the flow of liquid, as and for the purposes set forth.

5. In combination, substantially as shown and described, the shell A, the tubular filter fabric F, inclosed therein, the hollow core H and supporting devices I E D, the cylinder K, mounted on the top of the shell, and the reciprocating piston K', and means for operating the same for mechanically producing a pulsating action within the filter and effecting the distention and contraction of the tubular felt or filter fabric, as and for the purpose set forth.

6. The combination of the tubular standard H, the heads or disks E E', connected therewith, the netting or grate D, supported on said disks, the tubular felt F, and the clamp-plates I and J, substantially as and for the purpose described.

7. The combination, with the filtration-cylinder F, of the tubular slotted core or standard H, provided with projecting curved or inclined guard ribs or flanges for the purpose of deflecting the flow of liquid, substantially as described.

Witness my hand this 12th day of June, A. D. 1882.

JOHN HOWES.

Witnesses:
   CHAS. H. BURLEIGH,
   AUSTIN W. MATHEWS.